United States Patent
Rügamer

(10) Patent No.: US 7,712,415 B2
(45) Date of Patent: May 11, 2010

(54) DRIVE DEVICES AND METHOD FOR DRIVING A PROCESSING MACHINE

(75) Inventor: Erich Erhard Rügamer, Hettstadt (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 12/285,444

(22) Filed: Oct. 6, 2008

(65) Prior Publication Data
US 2009/0038491 A1    Feb. 12, 2009

Related U.S. Application Data

(62) Division of application No. 10/528,651, filed as application No. PCT/DE03/02972 on Sep. 9, 2003, now Pat. No. 7,448,321.

(30) Foreign Application Priority Data
Sep. 19, 2002    (DE) ................ 102 43 454

(51) Int. Cl.
    B41F 1/34    (2006.01)
(52) U.S. Cl. .................. 101/485; 101/483
(58) Field of Classification Search ........... 101/485, 101/483
    See application file for complete search history.

(56) References Cited

U.S. PATENT DOCUMENTS

| 4,369,402 A | * | 1/1983 | Gabor et al. ............ 318/685 |
| 4,552,066 A | | 11/1985 | Giori et al. |
| 4,872,247 A | | 10/1989 | Nakamura et al. |
| 5,309,834 A | | 5/1994 | Koch |
| 5,481,971 A | | 1/1996 | Grutzmacher et al. |
| 5,615,609 A | | 4/1997 | Hill et al. |
| 5,901,647 A | | 5/1999 | Kohlmann |
| 5,924,362 A | | 7/1999 | Volz et al. |
| 5,947,023 A | | 9/1999 | Bohrer et al. |
| 5,988,856 A | | 11/1999 | Braunstein et al. |
| 6,281,645 B1 | | 8/2001 | Matsukawa |
| 6,343,549 B1 | * | 2/2002 | Tokiwa ................ 101/248 |

(Continued)

FOREIGN PATENT DOCUMENTS

DE         105 767        5/1974

(Continued)

OTHER PUBLICATIONS

Kennel, Ralph; Weber, Rupert; "Datenkommunikation uber das Bussystem "SERCOS interface," Auswirkungen auf Antriebsregelungen in Werkzeugmaschinen," Automatisierungstechnische Praxis 33, No. 7, Jun. 5, 1999.

(Continued)

*Primary Examiner*—Anthony H. Nguyen
(74) *Attorney, Agent, or Firm*—Jones, Tullar & Cooper, P.C.

(57) ABSTRACT

A processing machine for webs includes second units which are driven independently of each other by drives. Signals for a lead axle position of a virtual lead axle are supplied to at least one signal line that connects the drives for these several units. The drives are each provided with an offset, which offset determines a permanent, but adjustable, displacement of a set angular position relative to the lead axle.

14 Claims, 4 Drawing Sheets

U.S. PATENT DOCUMENTS

| | | | |
|---|---|---|---|
| 6,446,553 | B1 | 9/2002 | Costin et al. |
| 6,456,808 | B1 * | 9/2002 | Chen et al. .................. 399/167 |
| 6,539,860 | B2 | 4/2003 | Tsunashima et al. |
| 6,679,172 | B2 | 1/2004 | Tokiwa |
| 6,725,771 | B2 * | 4/2004 | Tokiwa ....................... 101/181 |
| 6,823,792 | B2 | 11/2004 | Grützmacher et al. |
| 2002/0124743 | A1 | 9/2002 | Sommer |
| 2003/0140808 | A1 | 7/2003 | Knopf et al. |

FOREIGN PATENT DOCUMENTS

| | | |
|---|---|---|
| DE | 37 30 625 A1 | 3/1989 |
| DE | 37 80 625 T2 | 3/1993 |
| DE | 42 10 988 A1 | 10/1993 |
| DE | 195 27 199 A1 | 1/1997 |
| DE | 42 14 394 C2 | 8/1998 |
| EP | 0 095 437 | 11/1983 |
| EP | 0 930 552 A2 | 7/1999 |
| EP | 0 930 552 A3 | 12/1999 |
| EP | 1 151 865 A2 | 4/2001 |
| EP | 0 934 826 BI | 5/2001 |
| EP | 287 987 | 5/2002 |
| EP | 1 004 437 B1 | 7/2003 |
| JP | 2000-512480 | 1/1999 |
| WO | WO 97/18848 | 9/1996 |
| WO | WO 98/16384 | 10/1997 |

OTHER PUBLICATIONS

"Verfahren—Begriffsdefinition: Echtzeitfahigkeit, Rechtzeitigkeit, Jitter, Determinismus," www.software-kompetenz.de.

SERCOS Inteface, www.sercos.de/faq.htm.

Kiel, Edwin; Schierenberg, Oliver, "Einchip-Controller fur das SERCOS-Inteface," Elektronik, No. 6, p. 50, 55-59, (Mar. 17, 1992).

Harold Meis—Ethernet and SERBAS fur synchronisierte Antriebe in Vielachsanwendungen am Beispiel einer Zeitungsdurckmaschine-TAGUNGSBAND-Nov. 28-30, 2000.

SYNAX Dezentrales System zur Synchronisierung von Maschinenachsen Funktionsbeschreibung, Indramat, 1998.

SYNAX Decentralized System for the Syncrhonization of Machine Axes Functional Description, Indramat, 1998.

Hackel, Von Ingo, Konzepte der Antriebs- und ProzeBautomatisierung mit Modulpac C fur die Druck-, Papier- und Chemiefaserindustrie, Siemens-Energiegtechnik, 1979, pp. 306-309.

Deutscher Drucker "SYNAX—eine Systemlosung fur die elektronische Welle" May 8, 1997.

Deutscher Drucker "Sektionsubergreifende Produktionssicherheit" Oct. 5, 2001.

Huthig GmBH Heidelberg "TAGUNGSBAND" (pp. 377-389) 1997.

* cited by examiner

DRIVE DEVICES AND METHOD FOR DRIVING A PROCESSING MACHINE

CROSS REFERENCE TO RELATED APPLICATIONS

This U.S. patent application is a division of prior U.S. patent application Ser. No. 10/528,651, filed Mar. 21, 2005, now U.S. Pat. No. 7,448,321, issued Nov. 11, 2008. That application was the U.S. national phase, under 35 USC 371, of PCT/DE2003/002972, filed Sep. 9, 2003; published as WO 2004/028805 A1 on Apr. 8, 2004 and claiming priority to DE 102 43 454.9, filed Sep. 19, 2002, the disclosures of which are expressly incorporated herein by reference.

FIELD OF THE INVENTION

The present invention is directed to drive unit arrangements and to methods for driving a processing machine, in particular, a machine for processing webs. A processing machine has a plurality of units which are driven mechanically independently of each other by drive motors via drive units assigned to each one of them.

BACKGROUND OF THE INVENTION

A drive unit arrangement is known from DE 37 30 625 A1. A primary station is assigned to each print unit, or to the folder of a printing press, which primary station receives operating set points from a higher-order control device and passes them on to the secondary stations of the components involved.

DE 42 14 394 C2 discloses a drive unit arrangement for a printing press without a longitudinal shaft. The folder is connected, with respect to data with the groups of print locations via a bus. The folder provides its position reference to the groups of print locations. A drive control, which is common for the drive units of a single group of print locations, performs the fine adjustment of these drive units with respect to each other, as well as in relation to the folder.

A drive connection is known from EP 1 287 987 A1. Set points for angle positions and for speeds are generated for the individual drive units and are transmitted to all of the drive units, at predetermined time intervals, via a network.

A drive control mechanism is known from EP 1 151 865 A2. Actual master shaft pulses, as well as phase corrections, for the individual drive units, are transmitted to the respective drive units via a common network. In one embodiment, no correction value is transmitted to the drive unit of the folder, since its position is used as a reference.

WO 97/11848 shows the architecture of a drive system, in accordance with which, the individual drive units of a printing press are connected with an electronic shaft via a first bus, and additionally are connected with a parametrization bus for parametrization. This document criticizes the drive architecture of EP 0 567 741 A1, in which the guide system is split into a higher-order guide system, and into autonomous print location groups, and in which the synchronisation of the print location groups takes place from a folder.

A drive system for a printing press is disclosed in 2002/124743. Drive data specifications are output to drive control units that are assigned to respective individual motors by the use of data processing devices by a central operating and control unit via a data network.

SUMMARY OF THE INVENTION

The object of the present invention is directed to providing drive unit arrangements and methods for driving a processing machine.

In accordance with the present invention, this object is attained by the provision of a drive unit arrangement of a processing machine that has a plurality of units, which are driven mechanically independently of each other, by drive motors via drive units which are assigned to each one of the drive motors. At least one signal line is connected to the drive units or to a lower order drive control unit of these units. Signals from a master shaft position of a virtual master shaft are carried by the at least one signal line. An offset, which defines a displacement of the angular position set point, with respect to the master shaft position, can be provided to the drive units or to a lower-order control unit via at least one second signal line.

The advantages which can be gained by the present invention lie, in particular, in that by using the position reference of the virtual or electronic master shaft it is easier to manipulate errors regarding measuring systems and/or mechanical drive systems occurring in the printing units, as well as ones occurring in the folder. Because of the lack of interaction, and because of the reference to a common virtual master shaft, it is possible to set offset values for the drive units of the printing units, as well as for the folder, with respect to the virtual master shaft and, in an advantageous embodiment, to specify them for a defined type of production or web track.

An embodiment of the present invention is of advantage wherein an offset value, with respect to the master shaft, can be set, or can be specified, for each rotatory drive unit of the print units, or for at least the drive units of the forme cylinders, which are driven independently of other forme cylinders, and the folder. These offset values are set, for example in the respective drive controller of the drive unit, or preferably in a lower-order drive control unit, or are stored there as offset. The specification of a defined offset value can be entered or can be changed, for example, at a control console or can be stored there for a defined type of production. The offset value can be called up there, and thereafter can be transmitted to the drive controllers or the lower-order drive control units.

The embodiment of the present invention is of advantage, wherein the processing of the control signals, for all of the relevant drive units, does not take place in a higher-order drive control unit. Only a higher-order master shaft movement is transmitted by this drive control unit. The specific processing for an individual drive unit takes place in the drive unit itself, or in a lower-order control device, on the basis of the master shaft movement and additional specific information, such as, for example, offset or deviation from an angular position set point. The signal line or network, which is provided for the master shaft, is not unnecessarily burdened by a large number of different jobs for each one of the individual drive units. Accordingly, the repetition frequency for the position information and/or the dependability of the position information can be increased. In one variation of the present invention, the generation of the higher-order master shaft movement is taken over by one of several cross-linked lower-order drive unit control devices, which can then be considered to be the higher-order drive control unit, or master. In this case, the cross linkage also only carries the signals of the higher-order master shaft movement. A drive unit control device, which would be provided separately, can be omitted in this case.

In an advantageous embodiment of the present invention, networks differing from each other are provided for conducting the signals from the rotating electronic master shaft and for transmitting values which are specific to the drive units such as, for example, offset values with respect to the master shaft position. This serves the dependability in the transmission and speed in the course of data transmission.

An embodiment of the present invention is advantageous, wherein a lower-order drive control unit is provided between the drive unit to be controlled and the drive control unit which provides the master shaft position, which lower-order drive control unit picks up the overlapping master shaft position and, derived therefrom, performs the individual control, such as of angular position, or angular speed of the associated drive unit. In the case of a printing unit with several printing groups, or in the case of a printing tower, several drive units are advantageously assigned to this lower-order drive control unit.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
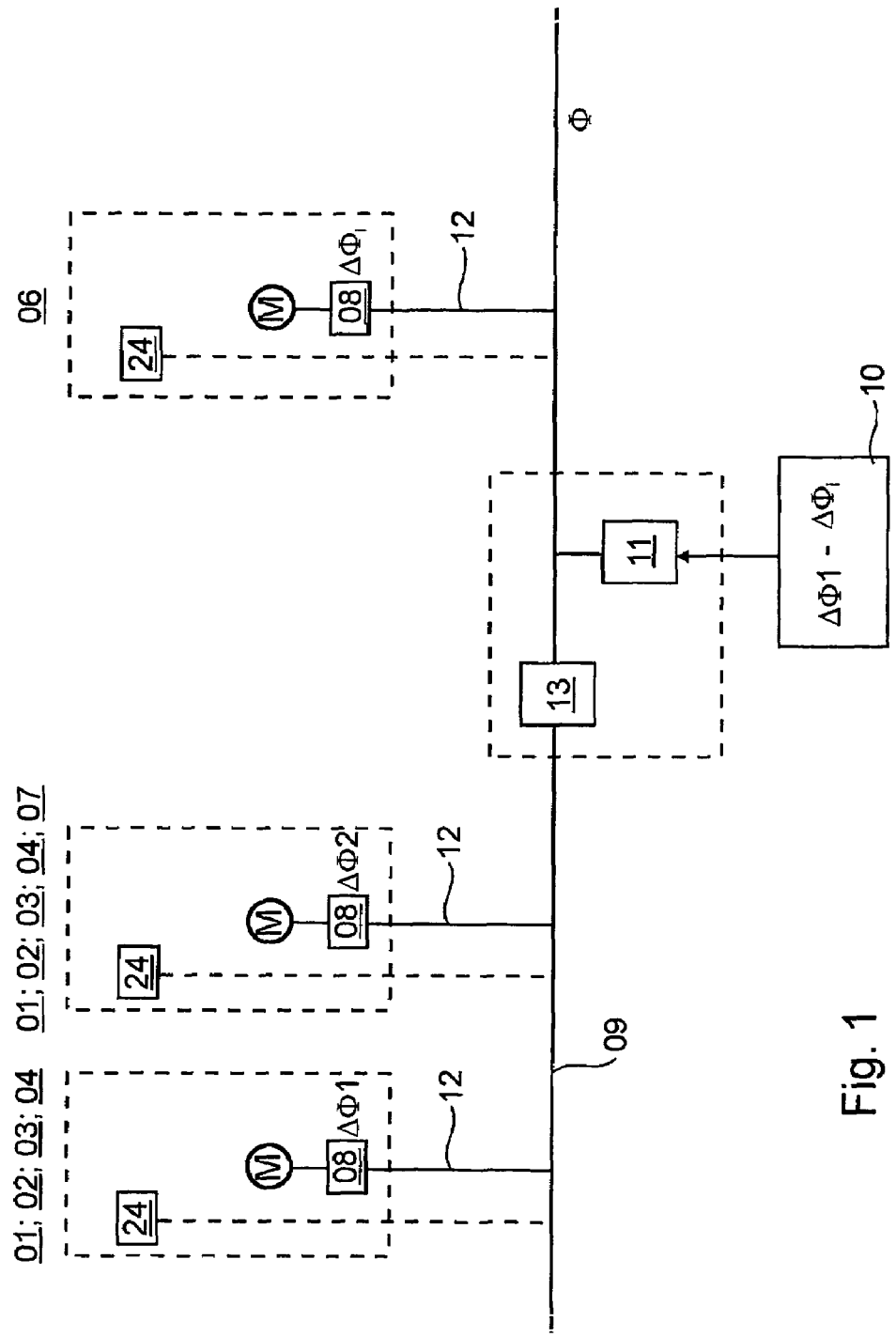
FIG. 1, a first preferred embodiment of the drive unit in accordance with the present invention, in FIG. 2, a second preferred embodiment of the drive unit, in FIG. 3, a third preferred embodiment of the drive unit, in FIG. 4, a schematic representation of a drive unit, and in FIG. 5, a schematic representation of the relative positions during operation.

A processing machine for web-shaped materials, such as, for example, a printing press, and, in particular, a web-fed rotary printing press, has several units, which are mechanically independent of each other, and each such unit is driven by a drive motor M. These units, which are driven independently of each other, can work together, for example, either directly or indirectly, with a web, for example with a web of material to be imprinted, which is passing through the printing press. These units therefore must be aligned with respect to their relative position to the web, or with respect to each other. Such units can be printing towers 01, individual printing units 02, individual printing groups 03, or individual cylinders 04, such as, in particular, individual forme cylinders 04 of printing groups 03. In the same way, such a unit can represent, for example, a unit 06, which further processes the web after it has been imprinted, which further unit 06 can be, in particular, a folder 06, perforating arrangements, punches, collecting arrangements, cutting arrangements, and the like, for example. Furthermore, such an independently driven unit can also be one or several guide elements 07, such as, for example, traction rollers, skip slitters, registration rollers, etc.

FIG. 1 shows three such units, which are driven, mechanically independently of each other, by drive motors M. For example, the two units shown at the left in FIG. 1 could be printing towers 01, printing units 02, printing groups 03 or cylinders 04. The middle unit, or a further, not specifically represented unit, could, however, also be a guide element 07. The right unit represents, for example, a further processing unit 06, and in particular represents the folder 06.

Drive units 08, or regulating units 08, which, in a simplified manner, are called drive units 08 with drive regulation in what follows, are assigned to the respective drive motors M, and are directly or indirectly connected with each other via at least one signal line 09, and with a computing and data processing unit 11, such as, for example, a computer 11. The computing and data processing unit 11 can additionally have an operating unit, or can be connected with an operating unit 10, for example a control console 10. Basically, the drive units 08, or the controllers, can be connected via signal lines 12 with the signal line 09 in series, which is not represented, directly in a ring or bus structure or, as represented, in a tree structure.

The at least one signal line 09 conducts signals of a reference master shaft position $\phi$, which is specified by a computing unit 13, for example a higher-order drive control unit 13. Together with the computing unit 13, the signal line 09 represents the so-called virtual master shaft 09, 13, or electronic shaft for the units connected with it, by the use of which, the units are aligned with respect to their position. This virtual master shaft position $\phi$ is passed on to the drive units 08 as a set point or reference variable.

The computing and data processing unit 11 provides set points with regard to the desired production speed, to the higher-order drive control unit 13, and in this way is connected with the drive unit 08 via the higher-order drive control unit 13, the signal line 09, for cross communication and the signal lines 12.

A specific offset $\Delta\phi$, for example an angular offset $\Delta\phi$, can be preset in each controller 08, which offset fixes a permanent, but adjustable displacement in relation to the master shaft position $\phi$Phi. This offset $\Delta\phi$ can be entered, for example, directly at the regulator 08 and/or via the computing and data processing unit 11 and/or can be stored and called up in a memory of the computing and data processing unit 11 for specific operating situations, in particular for specific web routings. If the signal line 09 is correspondingly configured, for example as a broad-band bus or as a broad-band network, the information regarding the respectively specified and fixed offset $\Delta\phi$, as well as the "rotating" master shaft position $\phi$, can possibly be provided over the common signal line 09. The signal line 09 can additionally be connected with a control system 24, which controls and/or regulates the actuators and drive units of the printing units 02 or printing groups 03 or folders 06 which differ from the drive motors M, such as ink supply, actuating movements of rollers and/or cylinders, dampening unit, positions, etc. This connection is represented by dashed lines.

The respective offset $\Delta\phi$ is transmitted, for example prior to the start of a production run, from the control console 10 or from the computing and data processing unit 11 to the drive units 08 and is stored there. In an advantageous embodiment, the offset $\Delta\phi_i$ can be changed during the operation or during the production run at the drive unit 08 itself, but in particular can be changed via the computing and data processing unit 11.

In a variation of the present invention, the offset values $\Delta\phi_i$ for the various drive units 08 can also be stored in the higher-order drive control unit 13. In this case, each drive unit 08 receives, as a set point, the sum of the rotating master shaft $\phi$ and the specific stored offset value $\Delta\phi_i$ of the respective drive unit 08 via the signal lines 09, 12 or, in situations of series connection, only 09.

Thus all drive units 08, for example the drive units 08 of the two first units, laid out as printing towers 01, for example, as well as the drive unit 08 of the unit embodied as a folder 06, respectively follow the rotating master shaft position $\phi$ of the higher-order drive control unit 13 with a respectively fixed offset value $\Delta\phi_i$ in respect to the absolute position of the master shaft position $\phi$.

Figure 2:
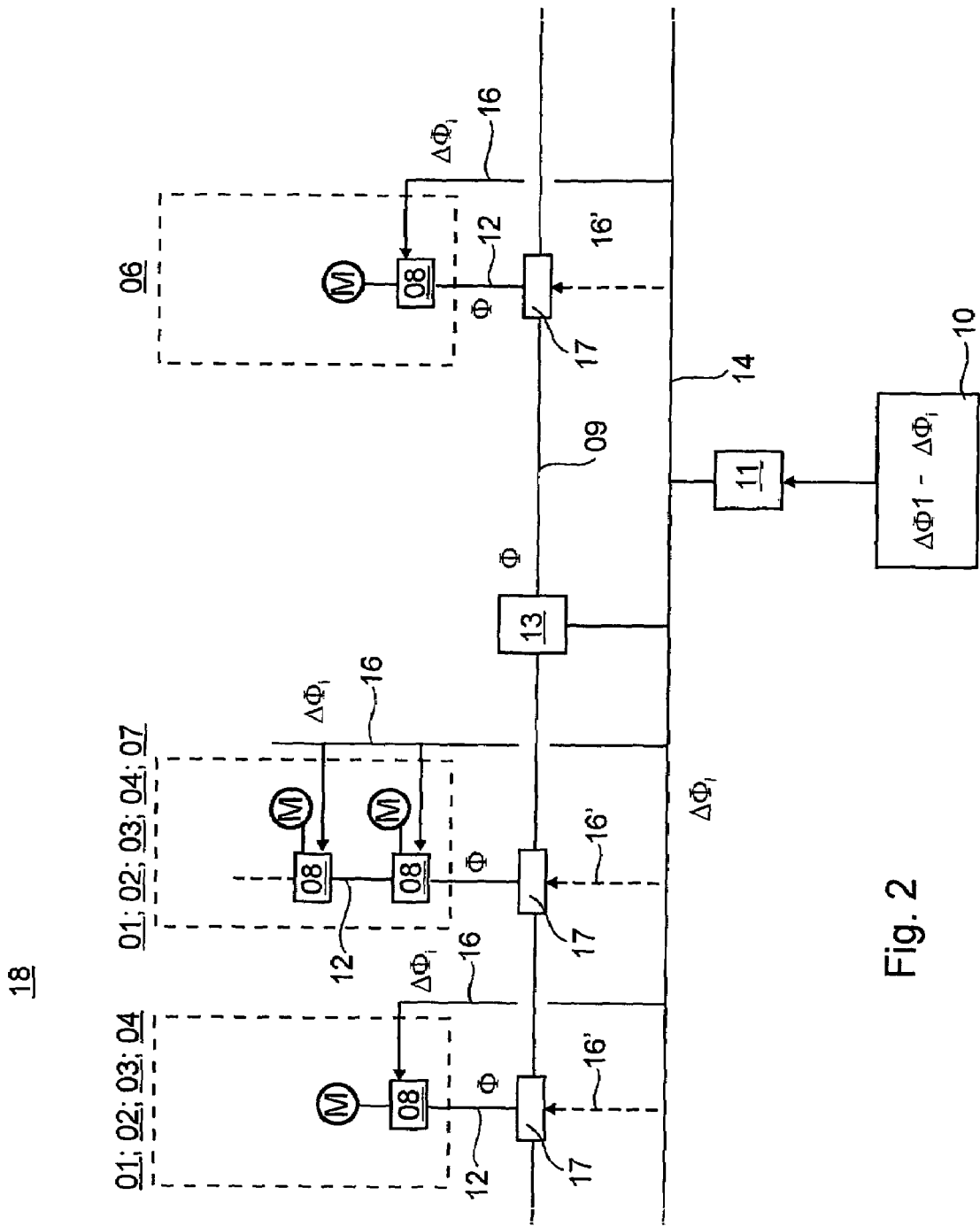

In contrast with FIG. 1, in FIG. 2 a second signal line 14, which is different from the first signal line 09, has been provided for the transmission of the respective offset $\Delta\varphi_i$ and, if required, further relevant data. Furthermore, for the connection between the first signal line 09 and the second signal line 14, or between the higher-order drive control unit 13 and the drive unit 08, a communications node 17, for example a lower-order drive control unit 17, is provided.

The computing unit 13 for specifying the master shaft position $\varphi$ is connected, for example via the signal line 14, with the computing and data processing unit 11, from which it, in turn, receives input with respect to the production speed or the actual rpm set point, for example. Now the respectively actual master shaft position $\varphi$ is specified by the higher-order drive control unit 13 and is fed into the signal line 09. From there, the information regarding the rotating master shaft position $\varphi$ is fed via the communications node 17 to the signal line 12 and is there directly provided to the drive units 08 which are relevant for the actual production run. A communications node 17 can, as represented in FIG. 2, be connected via the signal line 12, for example a network 12 of a ring or bus topology, with several lower-order units each driven by a drive motor M such as, for example, printing units 02, printing groups 03 or cylinders 04. The lower-order units, which are combined in this way via a communications node 17, will be called, in what follows, a group 18 of units or devices, which are mechanically driven independently of each other. In this case, the communications node 17 passes on, for example, the master shaft position $\varphi$ from the signal line 09 to the drive units 08 of all lower-order units or devices, which take part within the scope of the production run, for example printing units 02 or printing groups 03 of this group 18.

In the example of FIG. 2, the center unit represents such a group 18 of several sub-units, for example two printing units 02, two printing groups 03 or two guide elements 07, whose drive units 08 both receive the master shaft position $\varphi$ via the communications node 17.

In a first embodiment of the present invention, the production-specific offset values $\Delta\varphi_i$ are forwarded from the computing and data processing unit 11, or from the control console 10, to the individual drive units 08 of the units, where they are stored and are further processed, together with the master shaft position $\varphi$. In this case, the forwarding takes place, for example, in the manner of a tree structure from the signal line 14 via a common signal line 16 per unit, or in a star shape via several separate signal lines 16 per unit to the drive units 08, shown in solid lines.

Figure 3:
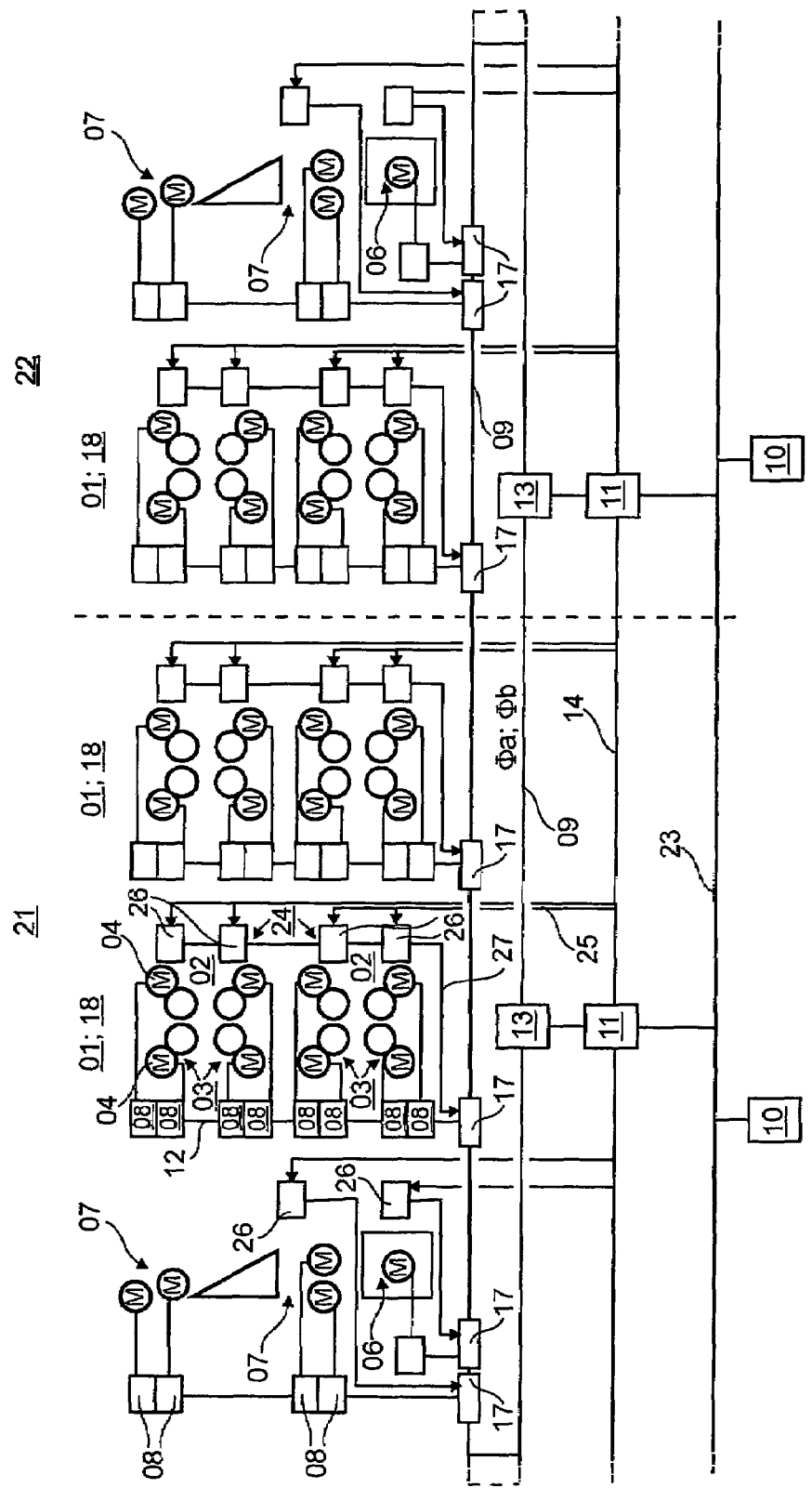

In a second embodiment, shown in dashed lines the forwarding of the offset $\Delta\varphi_i$ takes place from the signal line 14 via logical connections 16' directly or indirectly to the respective communications node 17. The physical embodiment of the logical connections 16' can be provided directly or indirectly via further connections, such a bus couplers, bridges, etc. or, for example, via a control system 24, as represented in FIG. 1 or 3. In this case, the signal line or lines 16 can be omitted. In a first variation of this embodiment, the specific offset $\Delta\varphi_i$ is forwarded from the communications node 17 only via the signal line 12 to the appropriate drive unit 08 and is stored there.

In a second advantageous embodiment of the present invention, the communications node 17 is configured as a lower-order drive control unit 17 with a memory, and with its own intelligence, in such a way that the offset values $\Delta\varphi_i$, which were specified for the associated drive units 08 and for the specific production run, are stored there, and that the drive units 08 participating in the production run are each provided with specific master shaft positions $\varphi_i'$, wherein ($\varphi_i' = \varphi + \Delta\varphi_i$, addressed to them, for example as angular position set point $\varphi_i'$, by the lower-order drive control unit 17. The interrelationship shown is intended to merely explain the principle here and in what follows. Of course, when following the specific master shaft position $\varphi_i'$, it is necessary to take into consideration the circumferences of the units to be driven, etc., so that an actual interrelationship has further unit-specific factors, for example.

Thus, the computing and data processing unit 11 is connected, on the one hand, with the drive units 08 via the higher-order drive control unit 13, the signal line 09, for cross communication, as well as with the signal lines 12, provided, for example, as buses 12. Information regarding the configuration, such as coupling in printing units 02 and/or printing groups 03, or for the common production speed, can also be exchanged in this way.

The higher-order drive control unit 13 is connected with the appropriate drive unit 08 for transmitting information regarding the specific offset $\Delta\varphi_i$, as described above, either via the signal line 14 and the signal lines 16, or via the signal line 14, the logical connection 16', the communication nodes 17 and the signal lines 12.

In the preferred embodiment of the present invention, in accordance with FIG. 2, the drive motors M, or the drive units 08 of the group 18, are connected with each other and with the lower-order control unit 17. The lower-order control units 17 of the groups 18 or units are connected with each other and with the higher-order drive control unit 13 via at least one signal line 09. In addition, for transmitting the specific offset values $\Delta\varphi_i$, the computing and data processing unit 11 is connected in this embodiment with the drive units 08, or the communications node 17, via at least one second signal line 14.

In an advantageous embodiment, the first signal line 09 is configured here as a real time-capable connection 09 with a fixed time frame for real time-relevant data and for deterministic time behavior. The first signal line or connection 09 can additionally have a channel in which, for example, data which are not real time-relevant, such as the transmission of the specific offset values $\Delta\varphi_i$ in accordance with the embodiment in FIG. 1, for example, and/or information regarding the configuration, production speed, etc. in accordance with the embodiment in FIG. 1, are transmitted.

The signal line 12, typically provided as a bus, is also configured in an advantageous embodiment, as a real time-capable connection 12 with a fixed time frame for real time-relevant data and deterministic time behavior. The connection 12 can additionally have a channel in which, for example, data which are not real time-relevant, such as the transmission of the specific offset values $\Delta\varphi_i$, and/or information regarding the configuration, production speed, etc., are transmitted.

The signal lines 14 and 16 are preferably configured as a network 14, or as a part of a network 14. In an advantageous embodiment, this network 14 can operate in accordance with a stochastic access method. However, data transmission should be possible at least by half-duplex operation.

FIG. 3 shows an example of the drive unit of a printing press with several, and in this case with three, printing towers 01, each of which has several printing groups 03, depicted here as double printing groups 03. Together with their drive units 08 and with the associated motors M, the printing groups 03 of a printing tower 01 constitute a group 18. In particular, they constitute a print position group 18, which is connected with the signal line 09 via the lower-order drive control unit 17 of this group 18. However, the drive control unit 13 can also manage sub-groups 02 of printing groups 03, for example printing units 02 or other divisions, each with assigned drive units 08. Further units, which have their own lower-order drive control units 17, for example one or several guide elements 07 or one or more folders 06, are also connected with this signal line 09. In this case, the signal line 09 is advantageously configured in accordance with a ring topology, and in particular is configured in the form of a double ring, and has one or more of the properties mentioned in connection with FIG. 2, above.

The signal line 09 is connected with several, depicted here as two, higher-order drive control units 13, each of which can feed signals, which are different from each other, of a respective master shaft position $\phi a$, $\phi b$ from a master shaft a, b into the signal line 09. This is advantageous, for example, if it is intended to assign the printing press, or its printing towers 01 and/or printing units 02 and/or printing groups 03 and the associated folders 06, as well as guide element 07, to several sections 21, 22, which can be operated separately or together. However, production runs and web tracks can pass over the separation between the sections, which separation is indicated in FIG. 3 by a dashed line, and can be conducted from printing units 03 of the one section 21, 22 into printing units 03, and/or the folders 06 of the other one. For example, the individual printing towers 01 can be assigned to different folders 06. Inside a printing tower 01, sub-groups, for example individual printing units 03, can also be assigned to different webs with different web tracks, which different webs can be conducted to a common folder 06, or even to different ones. Therefore, the sections 21, 22 should logically not be considered as rigid units.

The higher-order drive control units 13 each receive their specifications regarding the starting point and the production speed of the respective sections 21, 22, and/or the web track, from a respectively assigned computing and data processing unit 11, which, in turn, is connected with at least one control console 10. In an advantageous embodiment, the two computing and data processing units 11 are connected with each other and with a further signal line 23, which connects several, such as depicted here as two, control consoles 10 with each other.

The offset values $\Delta\phi_i$, which are relevant to the individual drive units 08 for the respective production run, are fed from the computing and data processing unit 11, via the signal line 14, to the lower-order drive control units 17 assigned to the respective drive unit 08 and are stored there in an advantageous embodiment, as described in connection with FIG. 2. These offset values $\Delta\phi_i$ are processed, together with the master shaft position $\phi a$, $\phi b$, to form the master shaft positions $\Delta\phi_i'$. If sub-groups, such as, for example, printing units 03 of a group 18, for example of a printing tower 01, are assigned to two different webs, the lower-order drive control unit 17 processes, together with the offset value $\Delta\phi_i$ which was specified for the respective web, the respective master shaft position $\phi a$, $\phi b$ of the master shaft a, b assigned to the respective drive unit 08, depending on the association of the respective print position with the one or the other web.

However, in this example, the transmission to the lower-order drive control units 17 does not take place directly, but instead via a control system 24, which is assigned to the respective group 18, or to the unit having its own lower-order drive control unit 17, such as, for example, a folder 06. The control system is connected with the signal line 14, or with the computing and data processing unit 11, either via its own signal lines 25, for example, or the line sections 25 are part of the signal line 14 embodied as a network 14. For example, the control system 24 controls and/or regulates the actuating members and drive units, which are different from the drive motors M, of the printing units 02, or of print position groups 18, or of printing groups 03, or folders 06, for example the ink distribution, actuating movements of rollers and/or cylinders, dampening unit, positions, etc. The control system 24 has one or has several, particularly memory-programmable control units 26. This control unit 26 is connected with the lower-order drive control unit 17 via a signal line 27. In the case of several control units 26, these are then also connected with each other via the signal line 27.

In an advantageous embodiment of the present invention, the control system 24, or its control unit or units 26 is or are releasably connected with the signal line 14 by coupling devices, which are not specifically represented, such as, for example, by bus couplers. Therefore, the group 18 can, in principle, be operated as a unit which is closed on itself, in which the control of the drive units 08 takes place via the train of the lower-order drive control unit 17 with the signal line 12, and the control of the further functions of the group 18 takes place via the train of the control system 24. Set points as well as actual values, and deviations can be input or output via the couplers. In this case, the lower-order drive control unit 17 performs the specification of a master shaft position $\phi$. For this reason, and for reasons of redundancy, it is advantageous if all lower-order drive control units 17 are configured with the option of generating and specifying a master shaft position $\phi$.

In the embodiment of the present invention, in accordance with the depiction of FIG. 3, the offset values $\Delta\phi_i$ are conducted from the signal line 14 via the respective control system 24 to the relevant lower-order drive control unit 17. As described in connection with the preferred embodiment in FIG. 2, the offset values $\Delta\phi_i$ can be alternatively provided from there to the drive units 08 and can be stored and processed there.

With the preferred embodiments in FIGS. 2 and 3, the higher-order drive control unit 13 can be omitted if, for example, one or several groups 18, or one of the units with their own lower-order drive control unit 17, such as, for example, the folder 06, have a lower-order drive control unit 17. The virtual master shaft, or the master shaft position $\phi$, can then be specified by one of the drive control units 17.

As described in connection with FIGS. 2 and 3, it is very advantageous to provide separate signal lines 09, or 16, 16', 14, 25, 27 for the rotation of a master shaft not yet adapted to the individual drive unit 08 and for the information regarding the angular position, offset values $\Delta\phi_i$, deviations from the registration. In this way, it is possible, for one thing, to attain the basic alignment of the individual drives 08 by transmitting and/or by changing the offset values $\Delta\phi_i$, as well as a correction of the angular position required during the production run, in view of the regulation of the linear registration, via the separate signal lines 16, 16', 14, 25, 27 to the lower-order drive control units 17, or the drive units 08 themselves. In case of a registration regulation, for example, an appropriate actuation value is conducted, via the signal line 27, to the control unit 17 and is superimposed on the set point formed from the master shaft position and offset $\Delta\phi_i$ in the course of determining the specific angular position set point for the individual drive unit 08. By the use of proceeding in this way, an increased flow of data over the signal line 09 conducting the master shaft data is avoided. It is also not necessary to conduct many different data packets, which are already matched to the respective drive unit 08, over this signal line 09. With respect to the individual drive unit 08, this would result in a clearly reduced possible signal rate. The lower-order drive control units 17 merely manage a tightly restricted number of drive units 08, so that the data in the signal lines 12 can be handled accordingly. This is not comparable to the number of all drive units 08 assigned to an entire section.

For all of the above-described embodiments of the present invention, at least one master shaft position φ, φa, φb is specified by at least one drive control unit 13, 17, which is used by the drive units 08 of the different units, driven independently of each other, for the alignment of their respective position. A specific offset value Δφ$_i$ can be assigned to each one of these drive units 08, which offset value expresses the respective desired position in relation to the master shaft position φ, φa, φb, of the assigned master shaft a, b. Thus, for a defined production run, for example, specific offset values Δφ$_i$, with respect to the master shaft a, b, which is relevant to this production run, are assigned to all drive units 08, which are mechanically independent of each other, of the printing towers 01 or of the printing units 02 or the printing groups 03, as well as to the assigned drive unit 08 of the folder 06 and, if required, guide elements 07.

These offset values Δφ$_i$ are substantially based on purely geometric conditions. For one, they are a function of the selected web track, i.e. of the web path between the individual units. Moreover, they can also be a function of an accidental or of a selected neutral position of the individual drive unit 08. The latter does not apply to the individual drive unit 08, if its defined neutral position coincides with the neutral position of the master shaft a, b.

Figure 4:
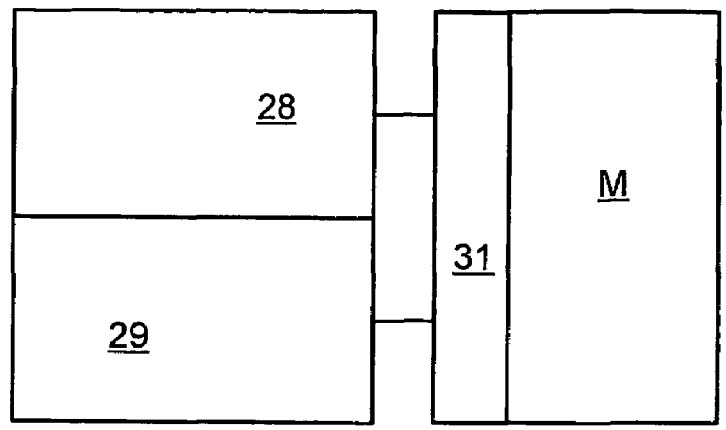

FIG. 4 schematically represents the components of a drive unit 08 with a drive motor M. The drive unit 08 has at least one controller 28, as well as a power element 29 for feeding in energy, for example. The drive unit 08 is connected with a sensor 21, which, in particular, is provided as an angle pulse generator 31, which reports the actual angle of rotation position of the drive motor M, or of the unit to be driven, to the controller 28. The angle pulse generator 31 is connected with a shaft, which is not specifically represented, of the drive motor M and follows its rotary movement on a 1 to 1 basis, or in another defined way. The angle pulse generator 31 can also be arranged on the unit to be driven by the drive motor M.

For example, a basic setting of the drive units 08, or the determination and fixation of the offset values Δφ$_i$, now takes place as follows:

Prior to the first start-up, a so-called basic registration position, or 0-position, must be approached as the reference position in the printing units 02, or in the printing groups 03, and in the folder 06. The same applies following the exchange of one or of several drive units 08 of the units or devices involved. This reference position is the position the folder 06 has with respect to registration in relation to the printing unit 02 or to the printing group 03, or to the forme cylinder 04 and to the counter-pressure cylinder within a printing group 03. In an advantageous embodiment of the present invention, the reference position is fixed by a mechanical visual marker at least at the forme cylinder 04, and at the counter-pressure cylinders of the printing groups 03, and at least at one of the cylinders, or rollers, of the folder 06, and in particular at the cutting cylinder.

For this purpose, the drive unit 08, or the drive motor M, is set mechanically, or by an electrical reverse movement, to the mechanical visual marker. The value from the angle pulse generator 31 is stored as the zero position, for example manually, or by the use of a service PC, at the drive 08, or at its controller 28. Memorizing can alternatively take place by use of the command "take up reference position" at the control console 10, wherein the value of the connected angle pulse generator is also stored as the zero position in the drive unit 08, or in its controller 28.

Since, as a rule, the zero position, which is taken over from the mechanical visual marker merely represents a rough value, now the actual offset value Δφ$_i$, or the angle offset Δφ$_i$, in relation to the master shaft position φ, φa, φb, as a function of the web track and additional factors, and corresponding to the print image, or the cut following the first printing, is determined mechanically or by appropriate measuring devices. As a rule, the determination of the offset values Δφ$_i$ is not made in the form of an angular measure, but as a length, measured, for example, in mm. However, this changes nothing in the basic principle of determination and storage, but only in connection with the further processing since, knowing the circumference of the respective units working together with the web, the linear measure can be converted into a angular measure and vice versa.

The value determined, for example in mm, of the offset Δφ$_i$ is performed by the use of an input mask, for example, for the so-called print registration input, or the print offset. These offset values Δφ$_i$, for example in mm, are passed on via the signal line 14 and, if provided, the signal line 23, as explained above, to the drive units 08 or to the lower-order drive control units 17. If the input is provided in mm, the values are converted to angle measurements. For example, the offset values Δφ$_i$, if they are transmitted via the control systems 24, in accordance with FIG. 3, are converted there to the corresponding offset values Δφ$_i$ in the form of angle measurements. These values Δφ$_i$, converted to angles, are passed on, in turn, by the control system 24, or by the control units 26, to the associated lower-order drive control unit 17 and are stored there in the form of offset values Δφ$_i$ in angle measurements.

The offset Δφ$_i$ for the drive unit 08 of the folder 06 regarding the so-called folding print offset is input in the same way at the control console 10 and/or the computing and data processing unit 11. The storage of this offset value Δφ$_i$ takes place in the drive unit 08 of the folder 06.

In principle, offset values Δφ$_i$ can assume any arbitrary values resulting from the offset with respect to the master shaft a, b. The offset value Δφ$_i$ can also be zero for individual drive units 08 of the printing groups 03 or of the folder 06, in which case there is no offset.

For automating, the manually determined offset values Δφ$_i$, which are a function of the web track, can be stored via the control console 10 and, when this production run is repeated, these values can be recalled and can again be passed on to the drive units 08 over the above mentioned track.

Figure 5:
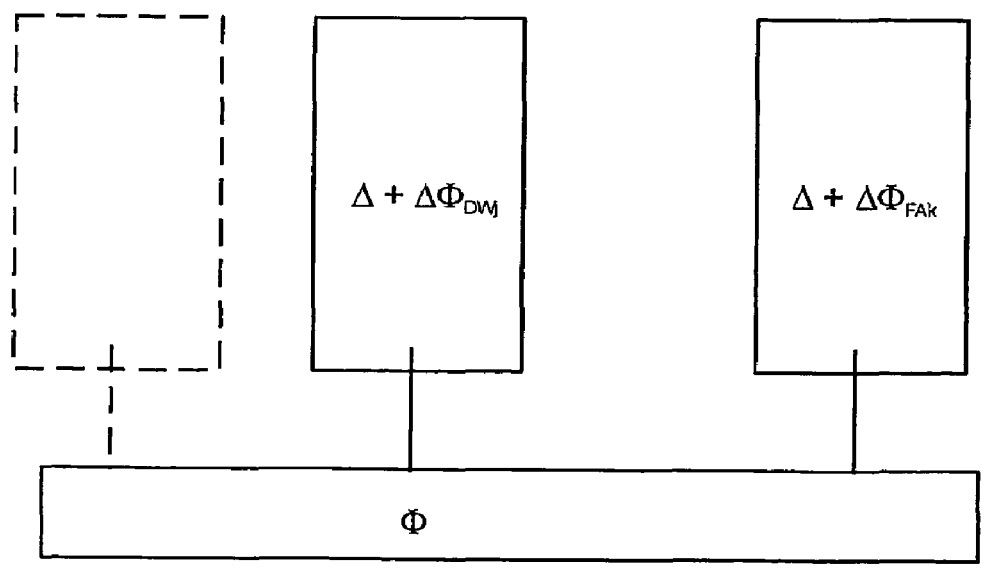

If now the printing press, or the respective unit, is operated, drive unit 08 follows, with its neutral position plus its added offset Δφ$_i$, the guide position φ, φa, φb and therefore is always in the correct position. FIG. 5 schematically represents this state with the master shaft a, b, which is common for the printing group 03 and the folder 06, and the master shaft position φ, φa, φb. The printing group 03, or the drive unit 08 driving it, receives the position φ+Δφ$_{DWj}$, i.e. the sum of the master shaft position φ, φa, φb and the offset Δφ$_{DWj}$ which is specific for this web track, for the j-th printing group 03, and for the folder 06, or its drive unit 08, the position φ+Δφ$_{F4k}$, the sum of the master shaft position φ, φa, φb and the offset Δφ$_{F4k}$ which is specific, for this web track for the k-th folder 06. These connections represent, as already mentioned above, the simplified principle without any further unit-specific factors.

In an advantageous embodiment of the present invention, a correction of the respective offset Δφ$_i$ is also possible from the control console 10, or from the computing and data processing unit 11, during a production run, or with the press running.

Start-up, or the operation of the printing press takes place as follows, for example:

For preparing for a defined production run, all of the units or devices which are required for this production run, are configured manually from the control console 10, or by the use of data which are prepared or memorized or read-in via a higher-order production system, and their drive units 08 are thus coupled to the appropriate master shaft a, b.

Drawing in the web or webs is subsequently possible, for example. To this end, the release of the movement of the master shaft a, b, takes place, for example, upon a command "draw in" if required, following a pre-warning by the system, that the network contractors of the drive units 08 have been turned on, and possibly another command.

In the same or similar way, start-up can take place with the web already drawn in or the webs drawn in.

During start-up or at a new start of the production run, the master shaft position $\phi$, $\phi a$, $\phi b$ is started from a defined stop position, such as angle position zero, or another fixedly preset value or, in an advantageous embodiment, from the last position, such as a last count or angle prior to taking up the motion again, which are stored, for example, in a permanent memory. All coupled drive units 08 required to maintain the registration must thereafter be aligned, corresponding to their preset conditions, offset values $\Delta\phi_i$, in accordance with this preset condition.

Periodically, at the end of a time interval of, for example 2 to 5 ms, a fresh guide position $\phi$, $\phi a$, $\phi b$ is put out by the higher-order drive control unit 13 to all drive units 08 involved in the production run, or to the lower-order drive control units 17, via the signal lines 09. During start-up, the master shaft a, b rotates at a reduced speed, or number of revolutions, for example corresponding to 1 m/min. At the start, the various drive units 08 can possibly be located arbitrarily "rotated" with respect to the master shaft a, b.

Now, the drive units 08 all follow this master shaft position $\phi$, $\phi a$, $\phi b$, or the specific master shaft positions $\phi_i'$, i.e. the press is running. If drive units 08, for which there is the requirement of maintaining registration, for example the printing groups 03 and the folder 06, still show deviations from the respectively specific master shaft positions $\phi_i'$, they rotate faster or slower until they have reached the specific master shaft position $\phi_i'$, i.e. are synchronized.

All guide elements 07 at the web, for example traction elements, are synchronized, at least with respect to their circumferential speed, with the master shaft position $\phi$, $\phi a$, $\phi b$, or its angular speed.

In an advantageous embodiment of the present invention, the production speed is only increased, for example to a number of revolutions corresponding to a web speed of 5 m/min, after synchronous running, or synchronicity of position or speed, of all of the drive units 08 is acknowledged.

At a constant speed, the master shaft position $\phi$, $\phi a$, $\phi b$ is passed on every 2 to 5 ms, for example by the higher order drive control unit 13, to the drive units 08, or to the lower-order drive control units 17. A command of "faster" results in an increased angular difference from the old to the new. When actuating "stop" and/or "block", all of the drive units 08 guided by the master shaft a, b return, for example via a ramp, to zero revolutions, and the network contractors of the drive units 08 are shut off, for example. A folder brake becomes active in an advantageous embodiment.

By the use of the above-described way of operating, the master shaft a, b always specifies the position at any time, except for the above mentioned clock frequency of the position transmission, and all of the coupled drive units 08 follow this position.

The offset values $\Delta\phi_i$ determined, and corrected, if required for this production run, or web track, are stored and are specified, for example, in the computing and data processing unit 11 or in the control console 10. If, at a later time, the same production run or web track is to be employed, these offset values $\Delta\phi_i$ can be called up and can be sent to the drive units 08, or to the drive control units 13, or, in particular, to the drive control unit 17, via the above described routes. This can take place automatically, for example, with the call-up of a configuration, which configuration was previously stored or was transmitted, via a higher-order print shop administration system, to the control console 10.

In accordance with a variation of the present invention, the master shaft position $\phi$, $\phi a$, $\phi b$ from the instantaneous angle position of a drive unit 08 of one of the units or devices is taken over on start-up or on a renewed production run. In this case, an offset value $\Delta\phi_i$ of zero exists between this drive unit 08 and the master shaft position $\phi$, $\phi a$, $\phi b$, at least at the start. In the further course of events, the remaining coupled drive units 08, with the requirement of maintaining registration, must be aligned in accordance with their preset conditions, offset values $\Delta\phi_i$ with the master shaft position $\phi$, $\phi a$, $\phi b$, as described above. In this case, the master shaft a, b again specifies the position at each point in time, and all coupled drive units 08, such as, for example, also the drive unit 08 used for aligning the master shaft a, b, follow this position. The drive unit 08 used for the alignment can then be charged for correction with an offset value $\Delta\phi_i$ not equal to zero in the further course of start-up and/or of the production run since, following the alignment of the master shaft a, b while standing still, all of the coupled drive units 08 align themselves only with the master shaft a, b.

Basically, the drive unit 08, which is used for the alignment, can be any drive unit 08 which has the requirement of maintaining registration, such as, for example, a drive unit 08 of a printing group 03. However, in an advantageous embodiment of the invention, the drive unit 08 of the folder 06, or the position of a cylinder of the folder, for example the position of the cutting cylinder, is employed for the alignment. Following the alignment, i.e. during operation, for example, the drive unit of the folder 06 receives the input again from the common master shaft a, b.

In a third variation of the present invention, for the alignment and the operation of the master shaft a, b, the master shaft a, b is synchronized not only for alignment with the angular position of the unit or device used for alignment, for example the folder 06, or its drive unit 08. During the operation, it also receives its position permanently or cyclically from the position of this unit, or this device, for example from the folder. In this variation, the position of all remaining drive units 08 is specified by the position of this unit or this device, the offset value $\Delta\phi_i$ between this unit and the master shaft a, b is always zero.

In regard to the linear registration, circumferential and/or cutting registration, it is basically possible to distinguish between at least three types or errors:

The imprints or images of different webs are, for example, not in registration with each other, but the cut agrees at least with one imprint, or web. In this case, for example, the printer either compensates for the registration error by manually changing the track preset at the control console, for example a change of a linear registration roller between the last print position of the web in question and the folder 06. However, a change of the offset values $\Delta\phi_i$ for the drive units 08 of the printing groups 03 of this web can also take place. Both variations can also take place automatically from a registration regulation unit.

If the imprints agree with each other, but the cut does not fit the imprint, the correction is possible from the control console by use of the so-called fold print offset, i.e. by a change of the offset $\Delta\phi_i$ for the drive unit 08 of the folder 06. The offset of the drive unit 08 is changed to an appropriate value.

If in a printing operation, the position of the colored inks with respect to each other, does not agree in the circumferential direction, the offset value $\Delta\phi_i$ of one or of several of the printing groups 03 involved can be changed at the control console 10 manually or as aided by an appropriate regulating system with a sensor. Their relative positions, with respect to each other, can thus be changed.

While preferred embodiments of drive devices and of methods for driving a processing machine, in accordance with the present invention, have been set forth fully and completely hereinabove, it will be apparent to one of skill in the art that various changes in, for example, the specific sizes of the cylinders, the structure of the drive motors, and the like could be made without departing from the true spirit and scope of the present invention which is accordingly to be limited only by the following claims.

What is claimed is:

1. A method for driving a web-fed rotary printing machine including:
   providing a plurality of press units in said printing machine;
   providing a separate drive motor for each one of said plurality of press units;
   using each said separate drive motor for driving its one of said plurality of press units independently;
   providing a separate drive regulation unit for each one of said separate drive motors;
   providing a higher order control unit;
   using said higher order control unit for generating a single master shaft angular position set point of a virtual master shaft;
   providing a lower order drive control unit for each said drive regulation unit;
   providing at least one first signal line;
   using said at least one first signal line for carrying said master shaft angular position set point to each said lower order drive control unit for each said drive regulation unit;
   generating a separate individual offset value for each of said separate drive motors for each of said plurality of press units, each said separate individual offset value defining a displacement of said angular set point position of each one of said separate drive motors with respect to said single master shaft angular position set point carried to each one of said lower order drive control units;
   providing at least one second signal line;
   using said at least one second signal line for carrying said separate individual offset values to each said lower order drive control unit;
   generating a specific master shaft position for each said separate drive motor in each said lower order drive control unit using said single master shaft angular set point and each said separate individual offset value;
   determining an actual angular position of one of said plurality of press units prior to starting of said web-fed rotary printing machine; and
   using said actual angular position of said one of said plurality of press units for aligning said single master shaft angular position set point.

2. The method of claim 1 further including providing said plurality of press units arranged in a web conveying direction of a web and specifying said angular set point position to each of said separate drive motors for each of said plurality of press units arranged in said web conveying direction.

3. The method of claim 1 further including providing at least one web processing unit having a web processing unit drive motor, locating said at least one of said web processing unit downstream, in a direction of web travel, of said plurality of press units, connecting said web processing unit drive motor to said at least one second signal line and using said at least one second signal line for carrying an individual offset value to said web processing unit drive motor.

4. The method of claim 1 further including specifying said master shaft position by said higher order control unit independently of an actual angular position of any of said plurality of press units.

5. The method of claim 1 further including providing an operating unit and entering said offset values using said operating unit.

6. The method of claim 1 further including providing a computer and data processing unit having a memory unit, storing said offset values for said separate drive motors for a specific production run of said printing machine in said memory unit and reading said stored offset values out of said memory unit.

7. The method of claim 1 further including aligning said master shaft position using an angular position of a folder prior to starting up said printing machine.

8. A method for driving a web-fed rotary printing machine including:
   providing a plurality of press units in said printing machine;
   providing a separate drive motor for each one of said plurality of press units;
   using each said separate drive motor for driving its one of said plurality of press units independently;
   providing a separate drive regulation unit for each one of said separate drive motors;
   providing a higher order control unit;
   using said higher order control unit for generating a single master shaft angular position set point of a virtual master shaft;
   providing a lower order drive control unit for each said drive regulation unit;
   providing at least one first signal line;
   using said at least one first signal line for carrying said master shaft angular position set point to each said lower order drive control unit for each said drive regulation unit;
   generating a separate individual offset value for each of said separate drive motors for each of said plurality of press units, each said separate individual offset value defining a displacement of said angular set point position of each one of said separate drive motors with respect to said single master shaft angular position set point carried to each one of said lower order drive units;
   providing at least one second signal line;
   using said at least one second signal line for carrying said separate individual offset values to each said lower order drive control unit;
   generating a specific master shaft position for each said separate drive motor in each said lower order drive control unit using said single master shaft angular set point and each said separate individual offset value;
   determining a last position of said virtual master shaft prior to stopping said web-fed rotary printing machine;
   storing said last position of said virtual master shaft; and generating said single master shaft angular position, prior to starting lip said web-fed rotary printing machine, using said stored last position of said virtual master shaft.

9. The method of claim 8 further including providing a computer and data processing unit having a memory unit and storing said last position of said virtual master shaft in said memory unit.

10. A method for driving a web-fed rotary printing machine including:
- providing a plurality of press units in said printing machine;
- providing a separate drive motor for each one of said plurality of press units;
- using each said separate drive motor for driving its one of said plurality of press units independently;
- providing a separate drive regulation unit for each one of said separate drive motors;
- providing a higher order control unit;
- generating a single master shaft angular position set point of a virtual master shaft using said higher order control unit;
- providing a lower order drive control unit for each said drive regulation unit;
- providing at least one first signal line;
- using said at least one first signal line for carrying said master shaft angular position set point to each said lower order drive control unit for each said drive regulation unit;
- determining an angular position of one of said plurality of press units in said printing machine;
- using said determined angular position for assigning said single master shaft angular set point;
- generating a separate individual offset value for remaining ones of said separate drive motors for each of said plurality of press units, each said separate individual offset value defining a displacement of said angular set point position of each one of said separate drive motors with respect to said single master shaft angular position set point carried to each one of said lower order drive control units;
- providing at least one second signal line;
- using said at least one second signal line for carrying said separate individual offset values to each said lower order drive control unit; and
- generating a master shaft position for each said separate drive motor in each said lower order drive control unit using said single master shaft angular set point and each said separate individual offset value.

11. The method of claim 10 further including assigning said master shaft angular position using said determined angular position prior to starting up said web-fed rotary processing machine.

12. The method of claim 10 further including continuing using said determined angular position for assigning said master shaft position during operation of said printing machine.

13. The method of claim 10 further including using said higher order control unit for generating said single master shaft angular position during operation of said web-fed rotary printing machine.

14. The method of claim 10 further including selecting another one of said plurality of press units as a reference unit prior to assigning said single master shaft angular set point.

* * * * *

UNITED STATES PATENT AND TRADEMARK OFFICE
CERTIFICATE OF CORRECTION

PATENT NO. : 7,712,415 B2  Page 1 of 1
APPLICATION NO. : 12/285444
DATED : May 11, 2010
INVENTOR(S) : Erich Erhard Rügamer It is certified that error appears in the above-identified patent and that said Letters Patent is hereby corrected as shown below:

Column 15, in claim 8, line 2, after "starting", change "lip" to -- up --.

Signed and Sealed this

Tenth Day of August, 2010

David J. Kappos
*Director of the United States Patent and Trademark Office*